US008990088B2

(12) United States Patent
Morton et al.

(10) Patent No.: US 8,990,088 B2
(45) Date of Patent: Mar. 24, 2015

(54) TOOL AND FRAMEWORK FOR CREATING CONSISTENT NORMALIZATION MAPS AND GRAMMARS

(75) Inventors: Rachel I. Morton, Redmond, WA (US); Nicholas J. Gedge, Redmond, WA (US); Heiko W. Rahmel, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1490 days.

(21) Appl. No.: 12/361,114

(22) Filed: Jan. 28, 2009

(65) Prior Publication Data
US 2010/0191519 A1 Jul. 29, 2010

(51) Int. Cl.
G10L 19/00 (2013.01)
G10L 15/193 (2013.01)
G10L 15/197 (2013.01)
G10L 15/06 (2013.01)

(52) U.S. Cl.
CPC ............ G10L 15/063 (2013.01); G10L 15/193 (2013.01)
USPC ........ 704/251; 704/275; 704/270.1; 704/270; 704/9

(58) Field of Classification Search
CPC ... G10L 15/265; G10L 15/063; G10L 15/193; H04M 2201/40; H04M 3/42221; H04M 3/51; H04M 3/5133; G06F 17/271; G06F 17/2715; G06F 17/2765; G06F 17/2775; G06F 17/279; G06F 17/2795; G06F 2203/04806; G06F 3/0481
USPC ............... 704/234, 251, 9, 10, 260, 275, 235, 704/257, 270.1, 273, E15.001, E15.022, 704/E15.23
See application file for complete search history.

(56) References Cited

U.S. PATENT DOCUMENTS

| | | | |
|---|---|---|---|
| 5,970,449 A | 10/1999 | Alleva et al. | |
| 6,058,366 A | 5/2000 | Tarkiainen et al. | |
| 6,330,530 B1 * | 12/2001 | Horiguchi et al. | 704/4 |
| 6,405,162 B1 * | 6/2002 | Segond et al. | 704/9 |
| 6,456,274 B1 * | 9/2002 | Van Hemert | 345/418 |
| 6,829,759 B1 * | 12/2004 | Davis et al. | 717/140 |
| 6,961,704 B1 | 11/2005 | Phillips et al. | |
| 6,986,104 B2 * | 1/2006 | Green et al. | 715/234 |
| 7,197,460 B1 | 3/2007 | Gupta et al. | |
| 7,280,964 B2 * | 10/2007 | Wilson et al. | 704/251 |
| 7,752,501 B2 * | 7/2010 | Bak | 714/38.14 |

(Continued)

OTHER PUBLICATIONS

"Speech Recognition and Synthesis with .NET 3.0", Retrieved at <<http://vascooliveira.com/Blog/archive/2008/09/08/speech-recognition-and-synthesis-with-.net-3.0.aspx>>, Sep. 8, 2008, pp. 2.

(Continued)

*Primary Examiner* — Abdelali Serrou
(74) *Attorney, Agent, or Firm* — Steven Spellman; Jim Ross; Micky Minhas (57) ABSTRACT

A runtime framework and authoring tool are provided for enabling linguistic experts to author text normalization maps and grammar libraries without requiring high level of technical or programming skills. Authors define or select terminals, map the terminals, and define rules for the mapping. The tool enables an author to validate their work, by executing the map in the same way the recognition engine does, causing consistency in results from authoring to user operations. The runtime is used by the speech engines and by the tools to provide consistent normalization for supported scenarios.

20 Claims, 9 Drawing Sheets

(56) References Cited

U.S. PATENT DOCUMENTS

| | | | |
|---|---|---|---|
| 7,899,674 B1* | 3/2011 | Rubin ............... | 704/270.1 |
| 2002/0077807 A1* | 6/2002 | Davis et al. ............ | 704/8 |
| 2004/0199375 A1* | 10/2004 | Ehsani et al. ............ | 704/4 |
| 2004/0220797 A1 | 11/2004 | Wang et al. | |
| 2005/0138556 A1* | 6/2005 | Brun et al. ............ | 715/536 |
| 2005/0288920 A1* | 12/2005 | Green et al. ............ | 704/3 |
| 2006/0069545 A1* | 3/2006 | Wu et al. ............ | 704/8 |
| 2006/0085187 A1 | 4/2006 | Barquilla | |
| 2009/0012984 A1* | 1/2009 | Ravid et al. ............ | 707/101 |
| 2009/0216533 A1* | 8/2009 | Leite et al. ............ | 704/251 |
| 2010/0082327 A1* | 4/2010 | Rogers et al. ............ | 704/4 |
| 2010/0082329 A1* | 4/2010 | Silverman et al. ............ | 704/8 |
| 2010/0082346 A1* | 4/2010 | Rogers et al. ............ | 704/260 |
| 2010/0082347 A1* | 4/2010 | Rogers et al. ............ | 704/260 |
| 2010/0082348 A1* | 4/2010 | Silverman et al. ............ | 704/260 |
| 2010/0082349 A1* | 4/2010 | Bellegarda et al. ............ | 704/260 |

OTHER PUBLICATIONS

"Web and Voice Technologies", Retrieved at <<http://books.mcgraw-hill.com/downloads/products/0072224584/0072224584_ch01.pdf>>, pp. 1-17.

* cited by examiner

TN AUTHORING TOOL — 500

FILE  VIEW  RUN TEST  GL TESTING  HELP

CURRENT MAP | NEW MAP | FILE NAME: | LOCATION PROGRESS | TEST CASE PROGRESS

| RULES | TERMINALS | TESTS | GL AUTHORING | GL TESTS |

EDITING TEST: CARDINALS_FOR_% ✗ ➕ | SELECTED VALUE — 570

DISPLAY FORM — 568

9.<sp>4 — 572

LAST TEST RESULT (TN)  PASS

| ALT. NUMBER | SPOKEN FORM |
|---|---|
| 0 | nove<sp>punto<sp>quattro |
| 1 | 9.<sp>4 |

SPOKEN FORM

Nove<sp>punto<sp>quattro — 574

LAST TEST RESULT (ITN)  PASS

| ALT. NUMBER | DISPLAY FORM |
|---|---|
| 0 | 9<sp>.<sp>4 |
| 1 | 9.<sp>4 |
| 2 | 9.4 |

— 576

| Associated With | Test Case Name | Display Form | Spoken Form | Disp → Spk. Pass | Max. TN Rank | Spk. → Disp Pass | Max. TN Rank |
|---|---|---|---|---|---|---|---|
| Cardinals_For_% | Cardinals_For_%... | 0.39 | zero virgola trenta... | ☑ | 10 | ☑ | 10 |
| Cardinals_For_% | Cardinals_For_%... | -0.99 | meno zero virgola... | ☑ | 10 | ☑ | 10 |
| Cardinals_For_% | Cardinals_For_%... | 5.2 | cinque punto due | ☑ | 10 | ☑ | 10 |
| Cardinals_For_% | Cardinals_For_%... | 9.4 | nove punto quattro | ☑ | 10 | ☑ | 10 |
| Cardinals_For_% | Cardinals_For_%... | 8e1/2 | otto e mezzo | ☑ | 10 | ☑ | 10 |
| Cardinals_For_% | Cardinals_For_%... | 3-4-5 | tre quattro cinque | ☑ | 10 | ☑ | 10 |
| Cardinals_For_% | Cardinals_For_%... | 100-50 | cento meno cinqu... | ☑ | 10 | ☑ | 10 |
| Cardinals; | Cardinals_test_1 | 1 | uno | ☑ | 10 | ☑ | 10 |
| Cardinals; | Cardinals_test_2 | 2 | due | ☑ | 10 | ☑ | 10 |
| Cardinals; | Cardinals_test_3 | 10 | deci | ☑ | 10 | ☑ | 10 |
| Cardinals; | Cardinals_test_4 | 11 | undci | ☑ | 10 | ☑ | 10 |

INFO: Test case Currency_test_6 passed when it was expected to fail. Spoken form "ventuno euro" resulted in display form....

TOOL AND FRAMEWORK FOR CREATING CONSISTENT NORMALIZATION MAPS AND GRAMMARS

BACKGROUND

One of the forefronts of computing technology is speech recognition, because people often find speech to be a familiar and convenient way to communicate information. With computerized applications controlling many aspects of daily activities from word processing to controlling appliances, providing speech recognition based interfaces for such applications is a high priority of research and development for many companies. Even web site operators and other content providers are deploying voice driven interfaces for allowing users to browse their content. The voice interfaces commonly include "grammars" that define valid utterances (words, terms, phrases, etc.) that can occur at a given state within an application's execution. The grammars are fed to a speech recognition system and used to interpret the user's voice entry.

During the development process of speech recognition and in some cases during the actual speech recognition process text needs to be converted from display form (e.g. 11) to spoken form (e.g. eleven) and vice versa. A text-to-speech (TTS) system converts normal language text into speech. In order to perform this task, conventional TTS systems need a process to convert symbols like digits "1" or brackets "(" into an appropriate spoken form. They also need to identify larger constructs such as a date written for example as "5/14/2000" as such and convert into a spoken form that is generally accepted by users such as "may fourteenth two thousand".

One way of converting text from display form to spoken form is achieved through a process called text normalization, which uses a rule based system to convert from one space to another. In order to provide these rules, a linguist with a high level of knowledge about the language is typically required, as well as technical knowledge about how to structure rules. This has historically caused a very high cost to the authoring process (time, resource, and financial costs). Furthermore, a spoken form (e.g. eleven) needs to be converted back to semantic properties (i.e. the value 11) for the speech application to take the appropriate action. Rules for common cases like dates, times, phone numbers are defined in a grammar library. The grammar library and normalization maps typically cover a shared set of areas like dates, but are normally authored separately, which leads to duplication of effort and differences in coverage.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing a runtime framework and an authoring tool for enabling the authoring of Text Normalization (TN) maps and Grammar Libraries (GLs) without requiring a high level of technical interpretation and/or programming skills. Users are enabled to define terminals, map the terminals, and defined rules based on the mapping. The tool also enables users to validate their work through test scenarios. By executing the mapping in the same way a recognition engine does, consistency in results is achieved from authoring to actual operation.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, linguists may be enabled to create consistent normalization maps and grammars without the need for advanced programming skills through an authoring tool and framework. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Figure 1:
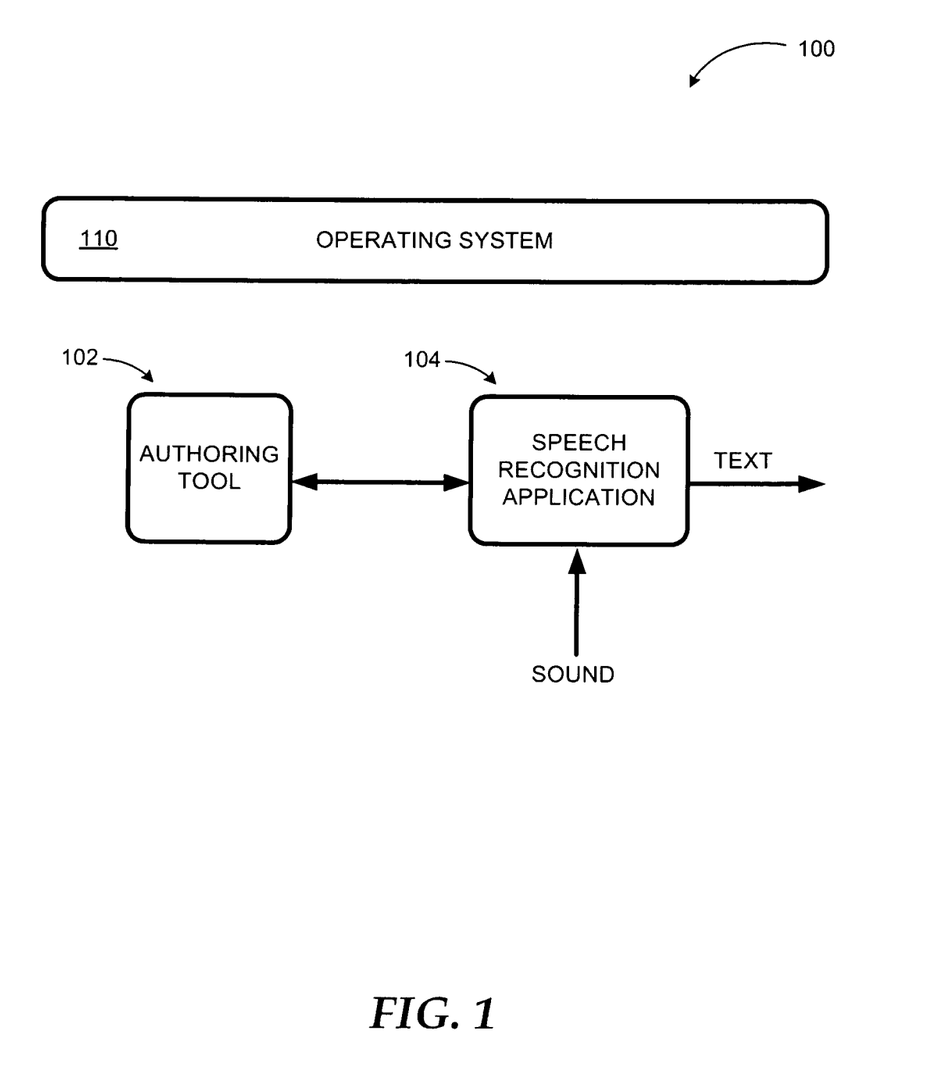
FIG. 1 is a diagram illustrating an example architecture of a system employing an authoring tool according to embodiments.

Referring to FIG. 1, diagram 100 of a system employing an authoring tool according to embodiments is illustrated. Conventional language technology component authoring systems utilize a three step approach, where a linguist first prepares rules for a given language, which are then converted into a programming algorithm by someone proficient in programming. The programmed recognition rules may then be tested, modified, categorized, etc. This fragmented approach is not only resource and time consuming, it is also vulnerable to errors and delays due to inconsistencies between different sets of rules and models. A framework according to embodiments enables enforcement of consistency between TN, inverse TN (ITN), and grammar library rules and represents those rules in a user-friendly way allowing easy manipulation for linguists and developers. Thus, the programming step may be eliminated and a linguist employing an authoring tool 102 may create the rules, test them, and modify appropriate libraries without the fragmentation. Authoring tool 102 provides rules and updated libraries to speech recognition application 104, which converts speech into text.

The ease of use in a system according to embodiments is facilitated by providing authoring tool 102 under the operating system 110 abstracting underlying logic to a graphical user interface (GUI) and allowing specification of terminals, list rules, and sequence rules, rather than writing those manually. Authoring tool 102 also enables specification of test cases associated with the terminal mapping that may be executed from within the tool UI to provide immediate feedback on the map being authored. Rules from the TN map may be exposed semantically, reusing the structure/values from the TN map to populate the grammar library. Grammar library portion of the tool employs a common functions definition, allowing functions that define semantic interpretation of the recognition result to be shared across languages, significantly reducing the cost of modifying functions at a later date. The framework separates out the structure of the rules into a map, which enables easy start up of new language development by enabling importation of the rule structure from a similar language or dialect and then localizing the terminals.

According to some embodiments, the runtime may be shared applying the rules between the speech engines (for both TN and ITN for recognition and TN for synthesis), which in turn ensures a consistent experience for the end-user for applications making use of those speech engines. Sharing the runtime with developer tools means that those tools generate models which are consistent with the end-user experience. For example, text used to train topics in a dictation resource kit used by developers to train language models for new dictation topics may be mapped into consistent spoken forms by the runtime TN used in the main dictation experience. Other (e.g. future) versions of the kit may include the tool allowing authors to extend both the runtime TN and the training tools to incorporate new TN/ITN rules specific to the topic area the developer wishes to cover.

Figure 2:
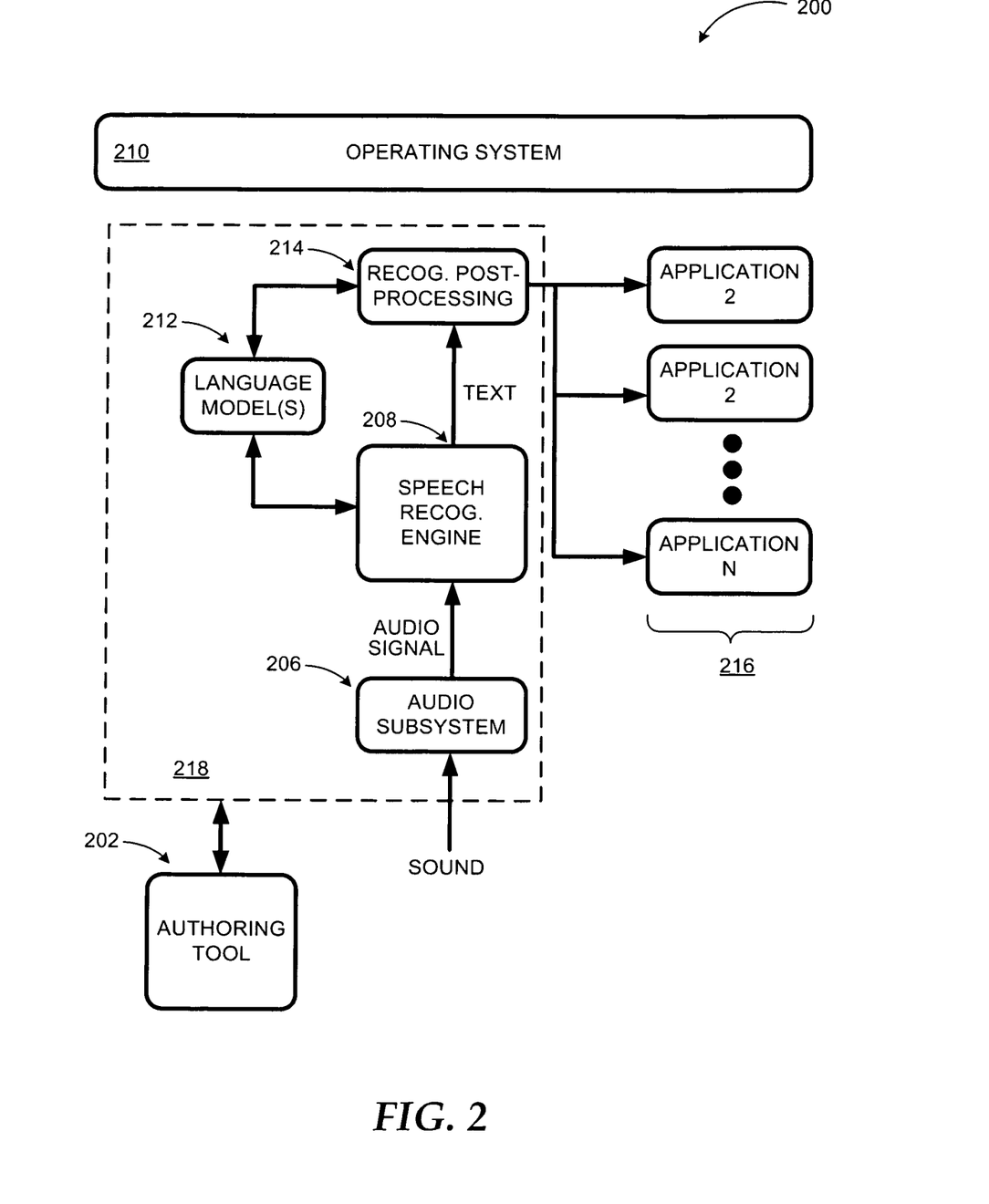
FIG. 2 illustrates another example system employing an authoring tool for creating consistent normalization maps and grammars.

FIG. 2 illustrates another example system 200 employing an authoring tool for creating consistent normalization maps and grammars in conjunction with a speech recognition system. In the example system, audio subsystem 206 begins the process of speech recognition by converting sound input to audio signals. This block is typically implemented as signal processors that are well known in the art. The audio signal is provided to speech recognition engine 208, which converts the audio signal to textual data.

Speech recognition engine 208 may comprise a number of components such as a language modeling module, a training module, a language model customization module, and the like. Speech recognition engine 208 recognizes words, phrases, and the like, based on customized language and acoustic models and provides textual versions of the audio utterances. Language model(s) 212 may be maintained by the speech recognition engine (or by a central application serving a multitude of speech recognition applications) and provide updated language model(s) to the speech recognition engine 208 and/or recognition post-processing module 214.

Recognition post-processing module 214 may perform the task of managing recognized text before it is provided to one or more applications such as application 1 through N (216). Text may also be provided to the speech recognition engine 208 in form of grammar or as a block of text, which is normalized at runtime. For text to speech (TTS) systems, the flow is reversed through the illustrated modules and recognition post-processing module 214 would be a pre-processing module. As shown in the figure, multiple applications may consume the recognized text. The consumption of the recognized audio and the recognition processes may be an interactive one, according to some embodiments, where user feedback for selection or correction of a recognized portion of the utterance is received before the entire utterance is recognized and consumed by the application(s) 216.

Applications 1 through N (216) represent any speech enabled application including, but not limited to, word processing applications, presentation applications, browsing applications, navigational assistance applications, communication applications, and the like. As discussed above authoring tool 202 provides for consistency between TN, ITN, and grammar library rules by enabling users to create, map, and test terminals and rules associating the terminals in a user-friendly manner. Operating system 210 provides a framework for the different components of the speech recognizing system to work within. While the illustration shows all components and the applications under one operating system, various portions of the architecture may be executed in different operating systems.

Audio system 206, speech recognition engine 208, language model(s) 212, and recognition post-processing module 214 may be individual modules executed in on different computing devices or an integrated application/service (e.g. system 218). Components of the speech recognizing system 218 such as grammar engine 214 may be loaded into a server, executed over a distributed network, executed in a client device, and the like. Furthermore, the components described above are for illustration purposes only, and do not constitute a limitation on the embodiments. A tool and framework for providing consistence creation of normalization maps and grammars in a speech recognizing system may be implemented using fewer or additional components in various orders. Individual components may be separate applications, or part of a single application. The speech recognition system or its components may include individually or collectively a user interface such as a web service, a Graphical User Interface (GUI), and the like.

Figure 3:
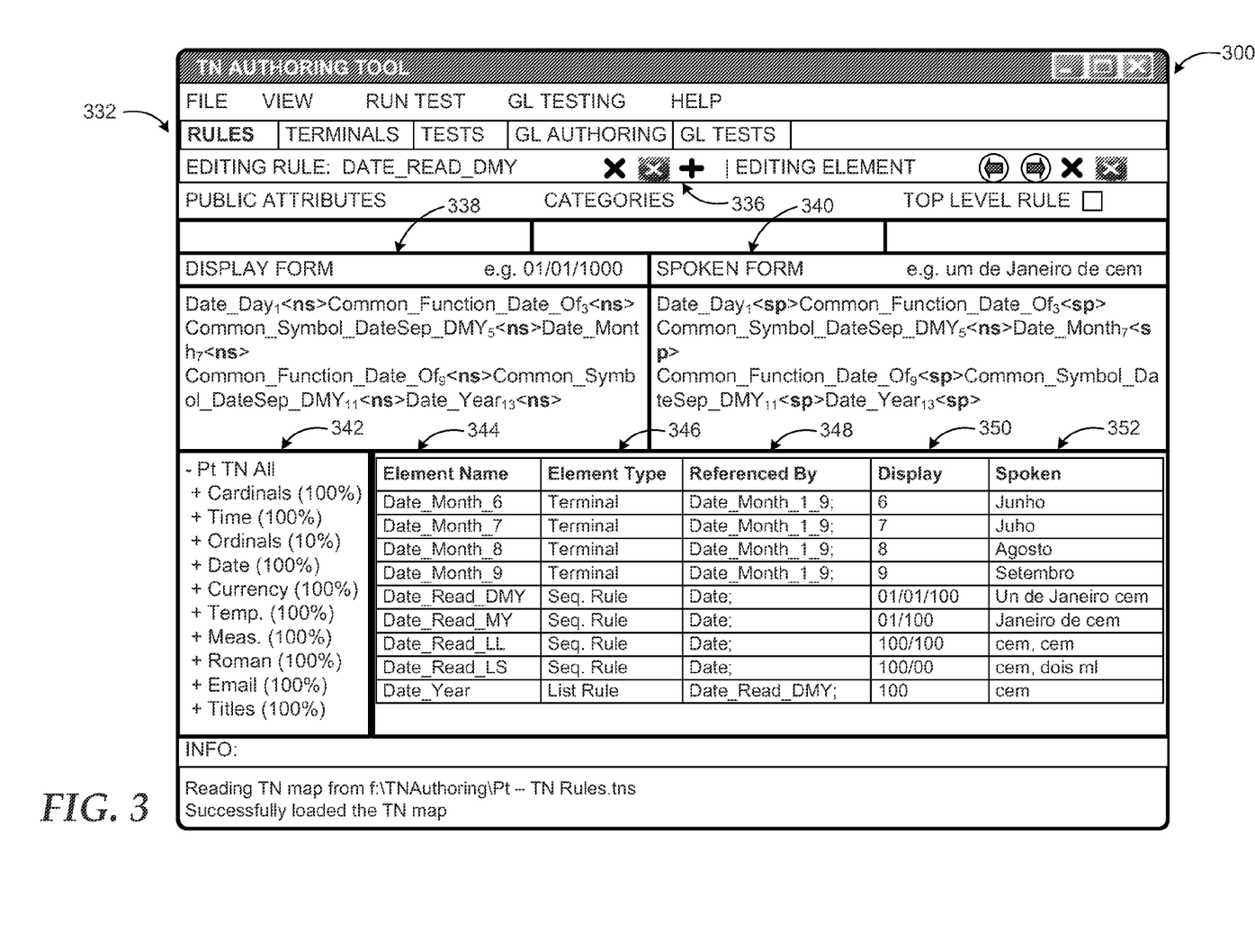
FIG. 3 is a screenshot of an example user interface for an authoring applications according to embodiments illustrating rule creation tools.

FIG. 3 is a screenshot of an example user interface for an authoring application according to embodiments illustrating rule creation tools. The example user interface of diagram 300 for an authoring application according to embodiments enables the author to build a TN map from the terminal level, on up to a fully blown representation of the languages TN needs. The author may create terminals (e.g. 1→one, 2→two) and combine those into list rules (e.g. Digits). From there, sequence rules (e.g. Tens Digits) may be formed allowing the author to build up the language in discrete and manageable parts using a UI rather than having to either author a structured document (e.g. xml) directly, or author a specification in parts later to be converted to xml by a developer.

In addition, the authoring tool allows for the specification of test cases that may be executed at any time against the map, allowing validation of the work in progress and quick resolution of issues. Once the TN map has been authored the author may select which rules to expose as part of the grammar library, and then select which functions to use to generate the semantics required. This allows for the same structure that was used in the TN map to be reused for grammar libraries. The tool may also provide an import mechanism for rules that enables the author to reuse work that was done in another language or dialect and preserve that structure when creating a new language (e.g. reuse the date rule structure between two languages and then localize the names for months, numbers, etc). This may greatly reduce the time and effort required to author new languages.

The example UI includes many standard features of a UI such as command tabs, drop-down menus, and comparable ones. In addition, authoring application specific tabs include "Rules" tab 332 for enabling the user to define rules based on available (selected) terminals. Textual and graphic elements such as icons 336 may be utilized to provide actions to the author such as adding a new rule, deleting a rule, and similar ones. Rules may be defined by the user or selected from a default categorized list 342. For visual ease, the list may be presented in a collapsible format. Once the author specifies the terminals and a rule by selection, definition, or a combination of both, those elements may be listed for visual feedback in a structured format such as the table in the lower portion of the UI listing element names (344), element types (346), referencing relationships 348. Example display and spoken forms of the specified elements (terminals, list rules, sequence rules) may also be listed.

According to some embodiments, the table discussed above may present available elements and associated information for selection by the author. Upon selection by the author, example display and spoken forms may be presented in the display form 338 and spoken form 340 areas in programmatic terms with the terminals and the rules spelled out. As a general rule, all two digit numbers are read in the order of the digits in the display form. This, a rule specifying how two digit numbers are to be read in English, may include the conversion of the first digit into the proper first word (2→twenty, 3→thirty, and so on) followed by the second digit. On the other hand, some languages such as German reverse the order of digits in spoken form. For example, 21 is read in German as "ein und zwanzig" (ein: one, zwanzig: twenty). Thus, a similar rule for German speech recognition may include reversing of the digits into the spoken form. The tool facilitates easy reordering of the terminals independently on the display and spoken form side using subscript indicators to allow the author to see the relationship between parts of the rule on either side.

The authoring tool discussed herein may also provide a number of features assisting user-friendly creation of rules. For example, all nouns have gender attributes in some languages and a qualifier of the noun such as an adjective must match the gender of the noun (e.g. una donna→a dame). The tool may verify this automatically during normalization complementing the rules created by the author. Another example is the German phrase "Ich sehe 1 Haus" (I see a house), where the 1 needs to be normalized to "ein" based on the gender of the noun "Haus". If the noun was "Frau" (woman), the 1 would need to be normalized to "eine". Of course, any other attributes such as a case of words (e.g. genitive, accusative), a plurality of the words (singular/plural), and comparable ones may also be verified similarly.

Thus, the normalization may depend on information about an adjacent word to the word needing to be normalized. This so-called agreement feature allows the following: (a) assigning attributes to terminals of the TN map from a schema; (b) marking up sequence rules such that specific attributes have to match between parts of the rule; (c) creating a wildcard terminal for a specific set of words (nouns, count words, etc. in the schema) in order to match "any" word in the lexicon (this wildcard may be part of the rule which requires agreement and thus leads the transducer to select the appropriate terminal from the list of possibilities of for example "1"); and (d) separating the complexities of the need for agreement between parts of a sequence rule from the overall rule structure even when wildcards are not involved and, thereby, simplifying the rule structure (for example, separate list rules for male numbers and female numbers are not needed, marking the affected terminals and then ensuring the agreement is specified correctly is usually sufficient). The attributes may cover a wide range of linguistic phenomena and are not necessarily constrained to that.

Another example feature that may be supported by the authoring tool is weighting of multiple mappings. Many examples of multiple mappings between terminals exist. For example, the digit "0" may be read as "zero" or "oh". Thus, many numbers may be read in two ways if they contain the digit "0". When multiple mappings are present, the authoring tool may provide a weighted list of those based on usage, preferences, or even local usage (regional use of different mappings may vary) enabling the author to enhance the speech recognition.

According to a further embodiment, a localization feature may enable the author to start with a template created for a particular language or dialect and modify select portions to generate another set of rules for a different language or dialect such as by replacing certain words (if the rules are identical but words are different, all of the words).

The UI for the authoring tool may display the elements (rules and/or terminals) in collapsible tree format. Various color or graphical schemes may be employed for ease of interaction. For example, each element may be displayed with a subscript number. The author may be enabled to order terminals and/or the rules by moving the subscript numbers around or listing the in a particular order. Furthermore, rules may also be presented in an alphabetical order or an order based on element type. The rules may also be searchable such that the author can find specific rules without having to go through a large number.

Figure 4:
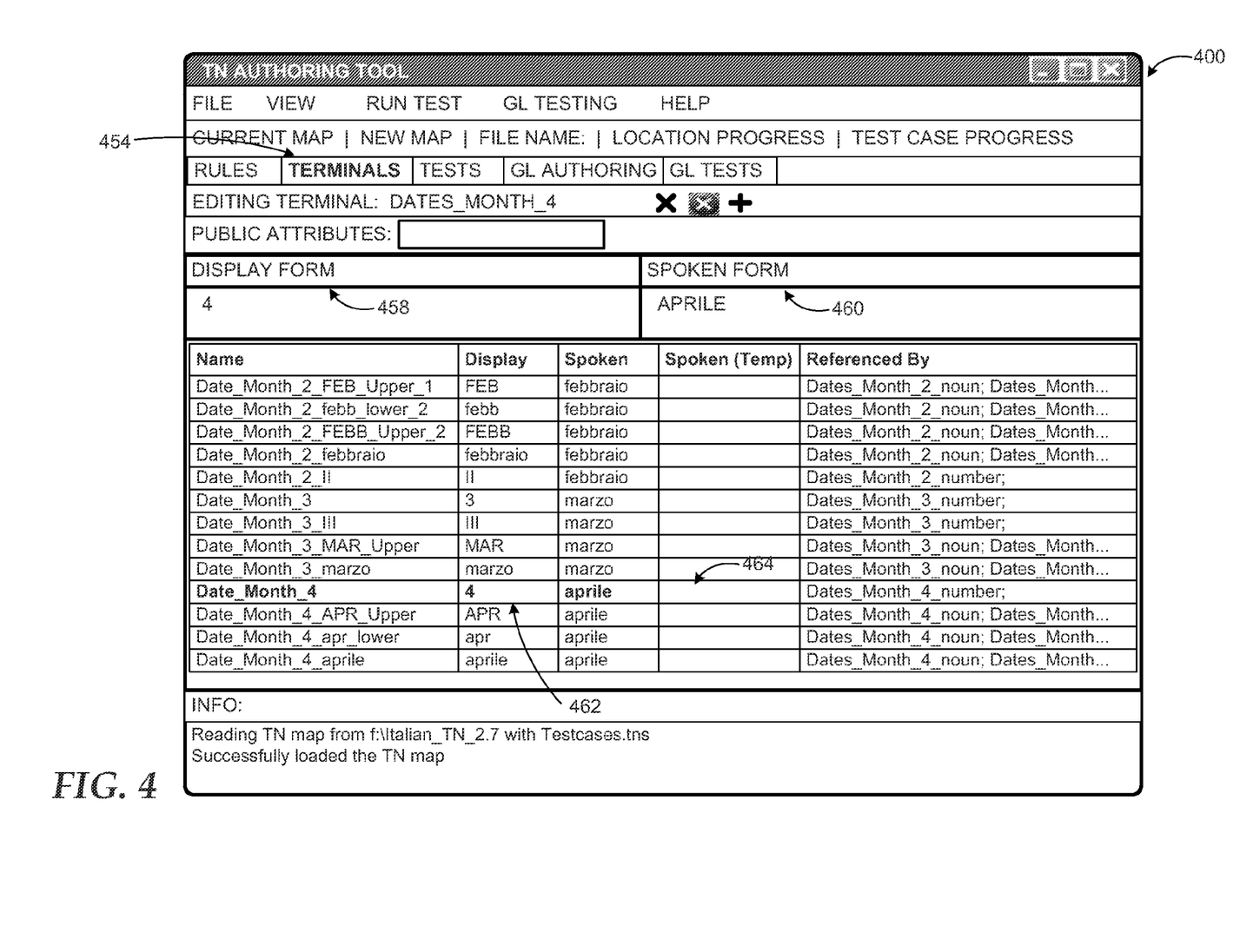
FIG. 4 is another screenshot of an example user interface for an authoring applications according to embodiments illustrating terminal definition tools.

FIG. 4 is another screenshot of an example user interface for an authoring application according to embodiments illustrating terminal definition tools. In the example screenshot 400, a "Terminal" tab 454 of the UI is illustrated. In addition to providing general information such as file name, localization progress status, test case status (456), the UI includes a listing of available terminals in tabular form. Names, display and spoken forms, as well as reference relationships of the available terminals are presented in the table. When a terminal is selected, the whole row is highlighted (464) (e.g. digit 4 with its name and spoken form next to the display form 462). The display form (458) and the spoken form (460) are also presented above the table for additional emphasis.

Figure 5:
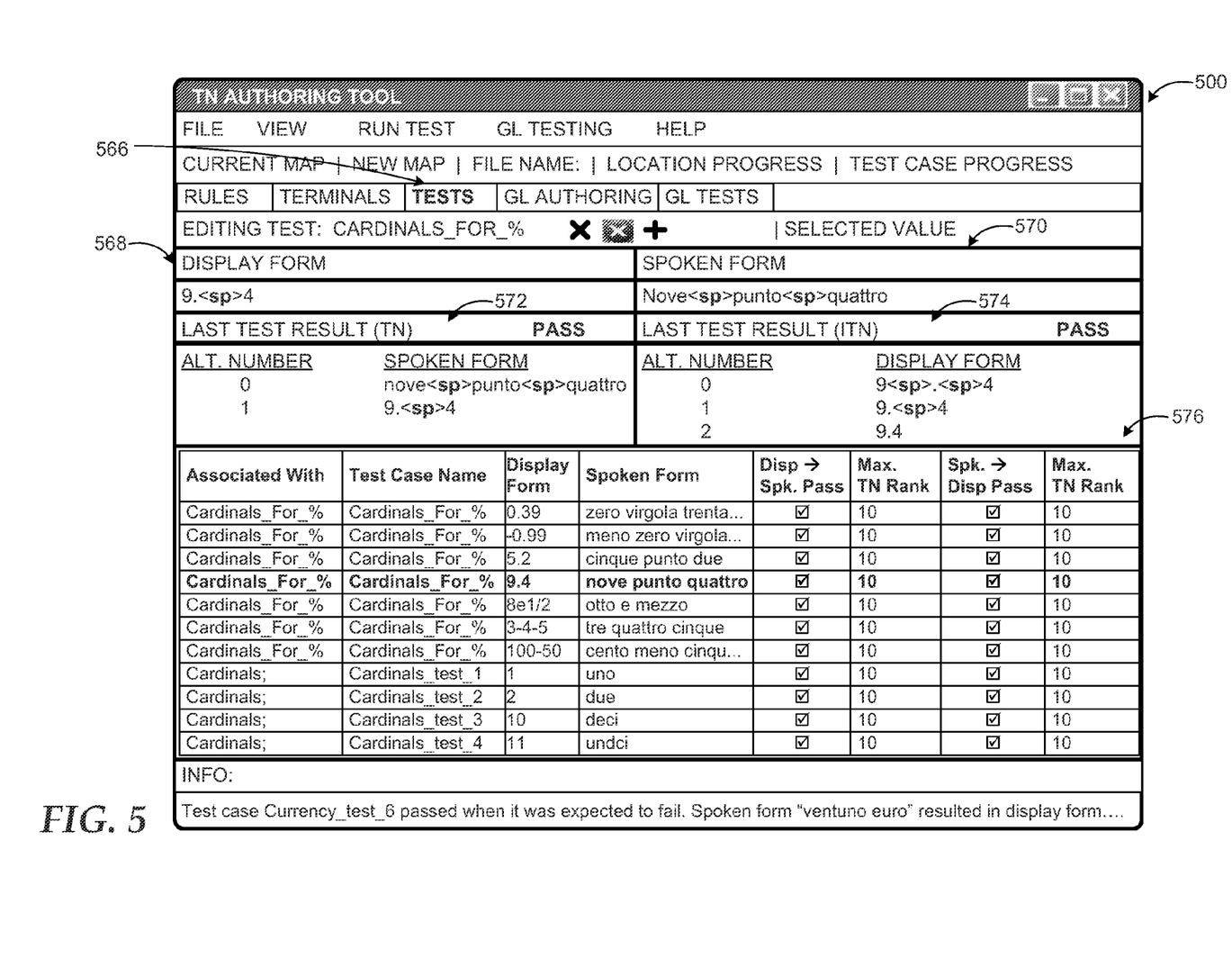
FIG. 5 is a screenshot of an example user interface for an authoring applications according to embodiments illustrating testing tools.

FIG. 5 is a screenshot of an example user interface for an authoring application according to embodiments illustrating testing tools. The "Tests" tab 566 is shown in screenshot 500 of the authoring tool UI. The selected rule and its terminals (recognition of decimal numbers) are shown in the display form box 568 and spoken form box 570. Tests are performed for both forms, TN test (572) for the display form and ITN test (574) for the spoken form. The detailed test results are displayed under the respective form boxes.

Table 576 in the lower portion of the UI lists test case names, display and spoken forms for each case, summary test results, and a ranking for each test case. More detailed information for individual test cases and the results are provided below the table. The summary test result columns are an example for the use of graphical elements for conveying some of the information (check marks instead of "pass").

Figure 6:
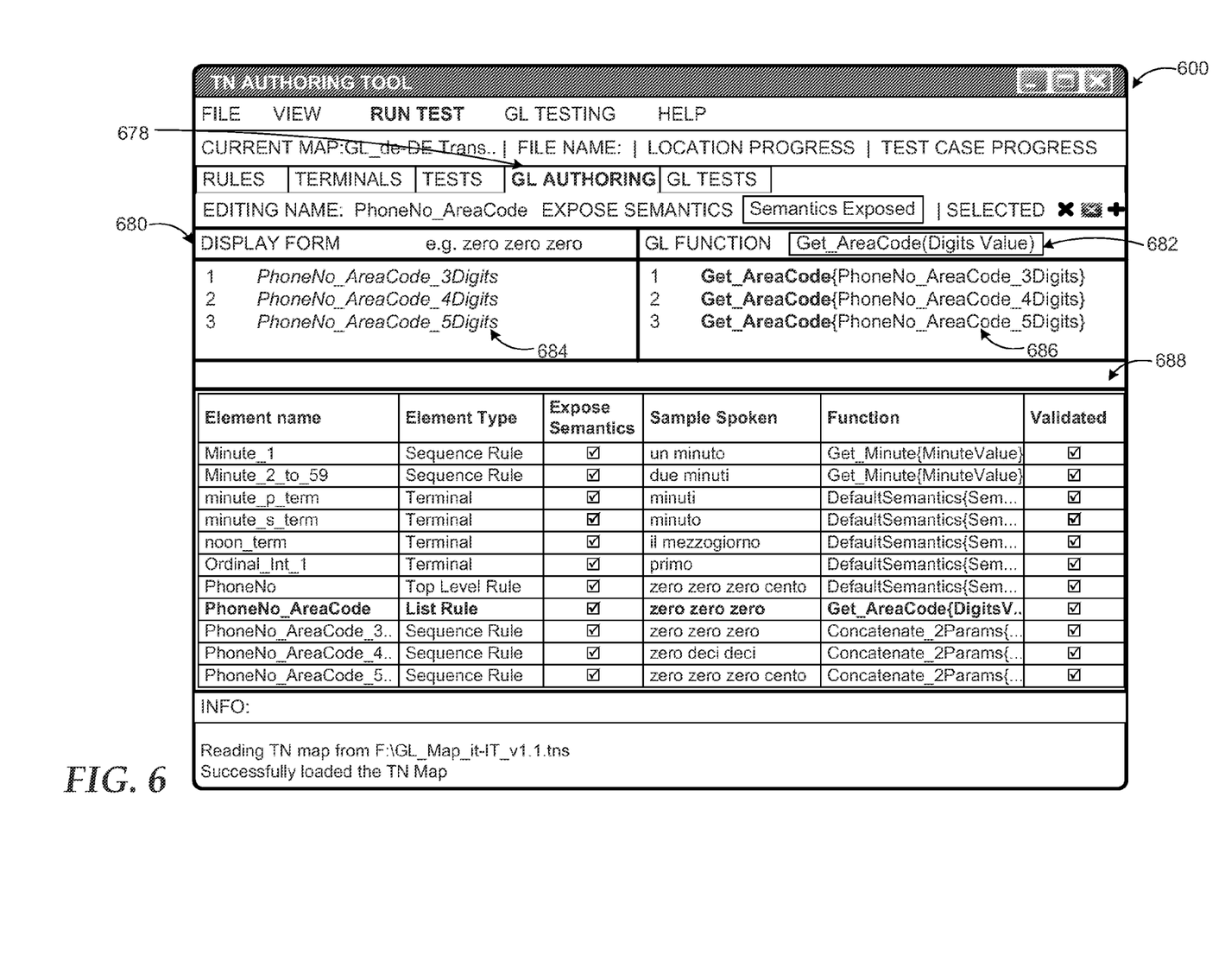
FIG. 6 is a screenshot of an example user interface for an authoring applications according to embodiments illustrating grammar library authoring tools.

FIG. 6 is a screenshot of an example user interface for an authoring application according to embodiments illustrating grammar library authoring tools. The "GL Authoring" tab 678 for adding tested and verified rules to a grammar library is shown in screenshot 600.

The example GL function illustrated in the figure is Get_AreaCode(digitsValue) for recognizing area code numbers. In the spoken form box 680, three example rules for 3, 4, and 5 digits are listed (684). Corresponding functions (686) are listed in the GL function box 682. The table 688 at the lower portion of the UI displays element name, element type (e.g. list rule), as well as an example of the spoken form and the function name. Whether the semantics of the rule should be exposed and whether the rule has been validated are also presented in graphical format (check marks). By using a common functions definition, functions may be shared across languages, significantly reducing the cost of modifying functions at a later date.

The authoring tool, its user interface, as well as elements and configurations of the user interface, described in FIG. 3-6 are exemplary for illustration purposes. A system for providing a tool and a framework for creating consistent normalization maps and grammars may be implemented using additional or fewer components and other schemes using the principles described herein.

Figure 7:
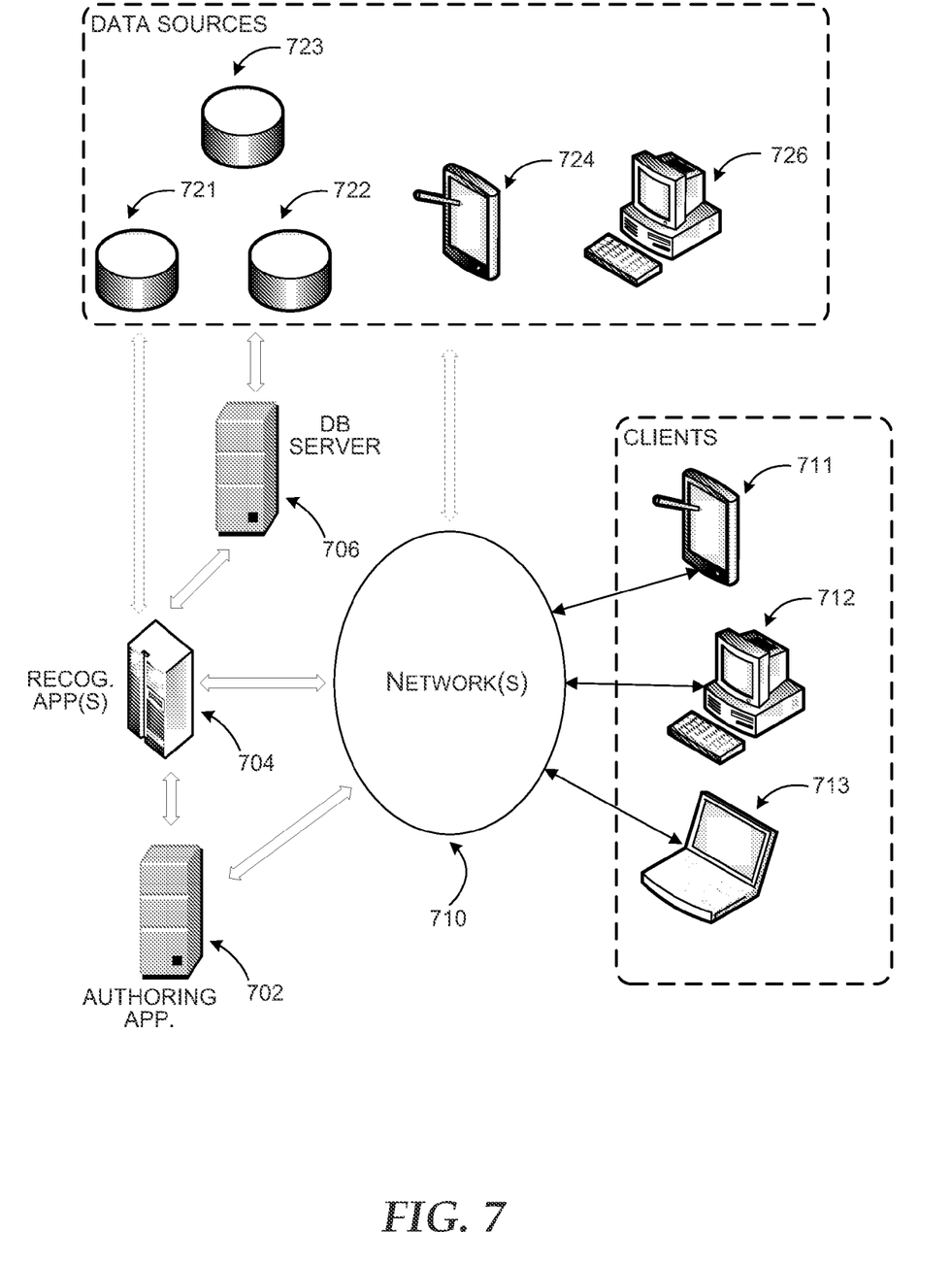
FIG. 7 illustrates a networked environment where embodiments may be implemented.

FIG. 7 is an example networked environment, where embodiments may be implemented. With the proliferation of Internet-based communication tools and applications, audio applications that provide voice communication and speech have grown in number and variety. Such applications may be local applications residing on client devices or hosted applications executed by a service and used by a client device/application remotely. In any case, audio signals carrying voice are propagated from a source device/application to server 704 in a networked environment and converted into text with the involvement of an authoring application executed on server 702. An authoring application enabling creation and testing of normalization maps and grammars according to embodiments may be implemented locally or in a distributed manner over a number of physical and virtual clients (e.g. clients 711-713) and servers (e.g. 702). It may also be implemented in un-clustered systems or clustered systems employing a number of nodes communicating over one or more networks (e.g. network(s) 710).

Such a system may comprise any topology of servers, clients, Internet service providers, and communication media. Also, the system may have a static or dynamic topology. The term "client" may refer to a client application or a client device. While a networked system implementing echo determination may involve many more components, relevant ones are discussed in conjunction with this figure.

Data associated with authoring normalization maps and grammars, as well as speech recognition, may be generated or modified by the authoring and speech recognition applications, as well as by user through other applications executed on client devices 724, 726, and stored in data stores 721-723. The data stores may be accessed directly or through database server 706.

Network(s) 710 may include a secure network such as an enterprise network, an unsecure network such as a wireless open network, or the Internet. Network(s) 710 provide communication between the nodes described herein. By way of example, and not limitation, network(s) 710 may include wired media such as a wired network or direct-wired connection, and wireless media such as acoustic, RF, infrared and other wireless media.

Many other configurations of computing devices, applications, data sources, data distribution systems may be employed to implement authoring and testing of normalization maps, rules, and grammars. Furthermore, the networked environments discussed in FIG. 7 are for illustration purposes only. Embodiments are not limited to the example applications, modules, or processes.

Figure 8:
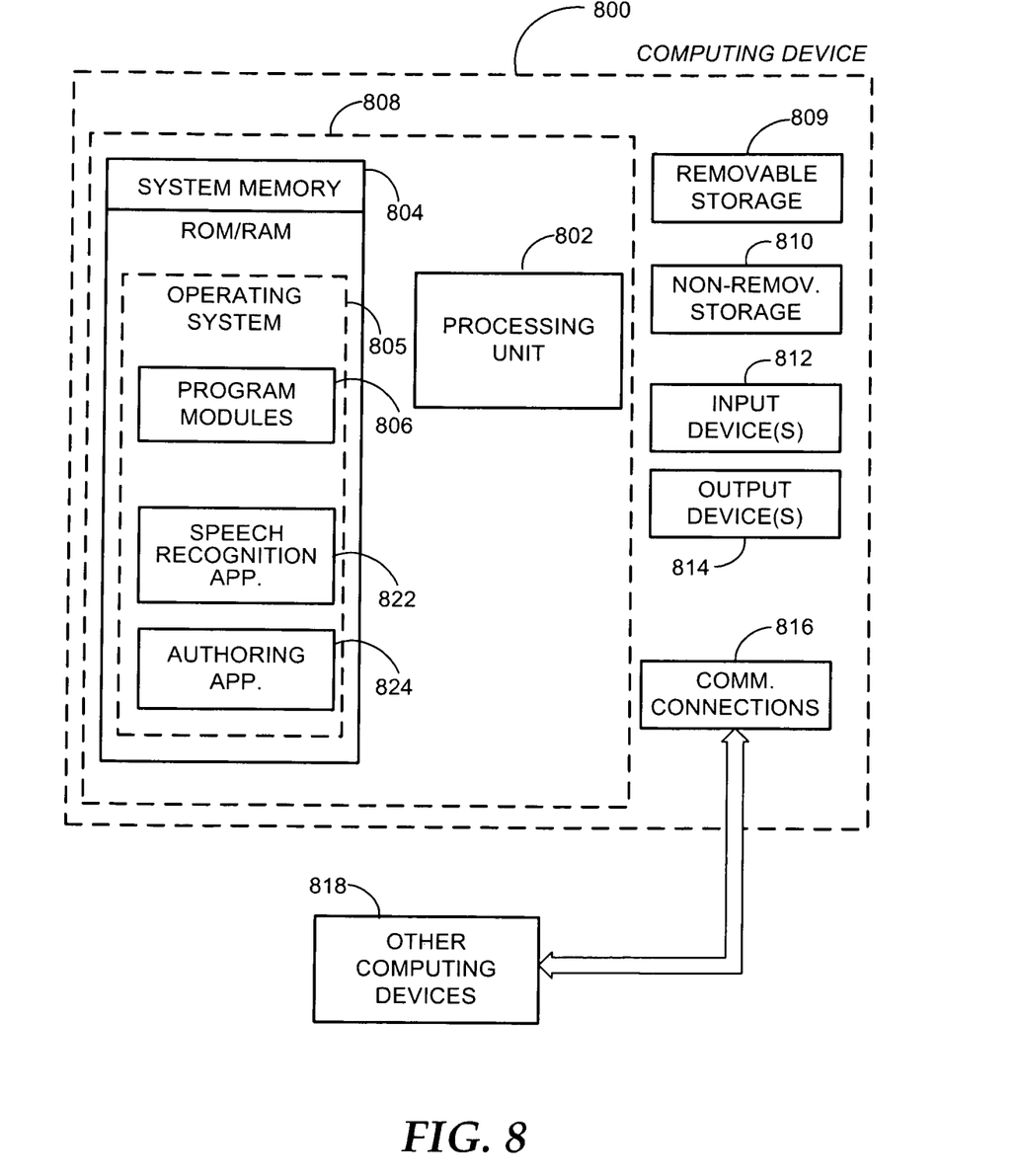
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment is illustrated, such as computing device 800. In a basic configuration, the computing device 800 may be a client device or server executing an authoring application according to embodiments and typically include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the computing device, such as the WINDOWS® operating systems from MICROSOFT CORPORATION of Redmond, Wash. The system memory 804 may also include one or more software applications such as program modules 806, speech recognition application 822 and authoring application 826.

Speech recognition application 622 may be a separate application or an integral module of a hosted service application that provides speech recognition based on received voice input and training libraries through computing device 800. Authoring application 826 enables users to create and map terminals, create rules, test the rules, and update grammar libraries in a consistent manner with the actual execution of the speech recognition application as discussed above. This basic configuration is illustrated in FIG. 8 by those components within dashed line 808.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well known in the art and need not be discussed at length here.

The computing device 800 may also contain communication connections 816 that allow the device to communicate with other computing devices 818, such as over a wireless network in a distributed computing environment, for example, an intranet or the Internet. Other computing devices 818 may include client devices or server(s) that execute applications associated with receiving voice and providing speech recognition results. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
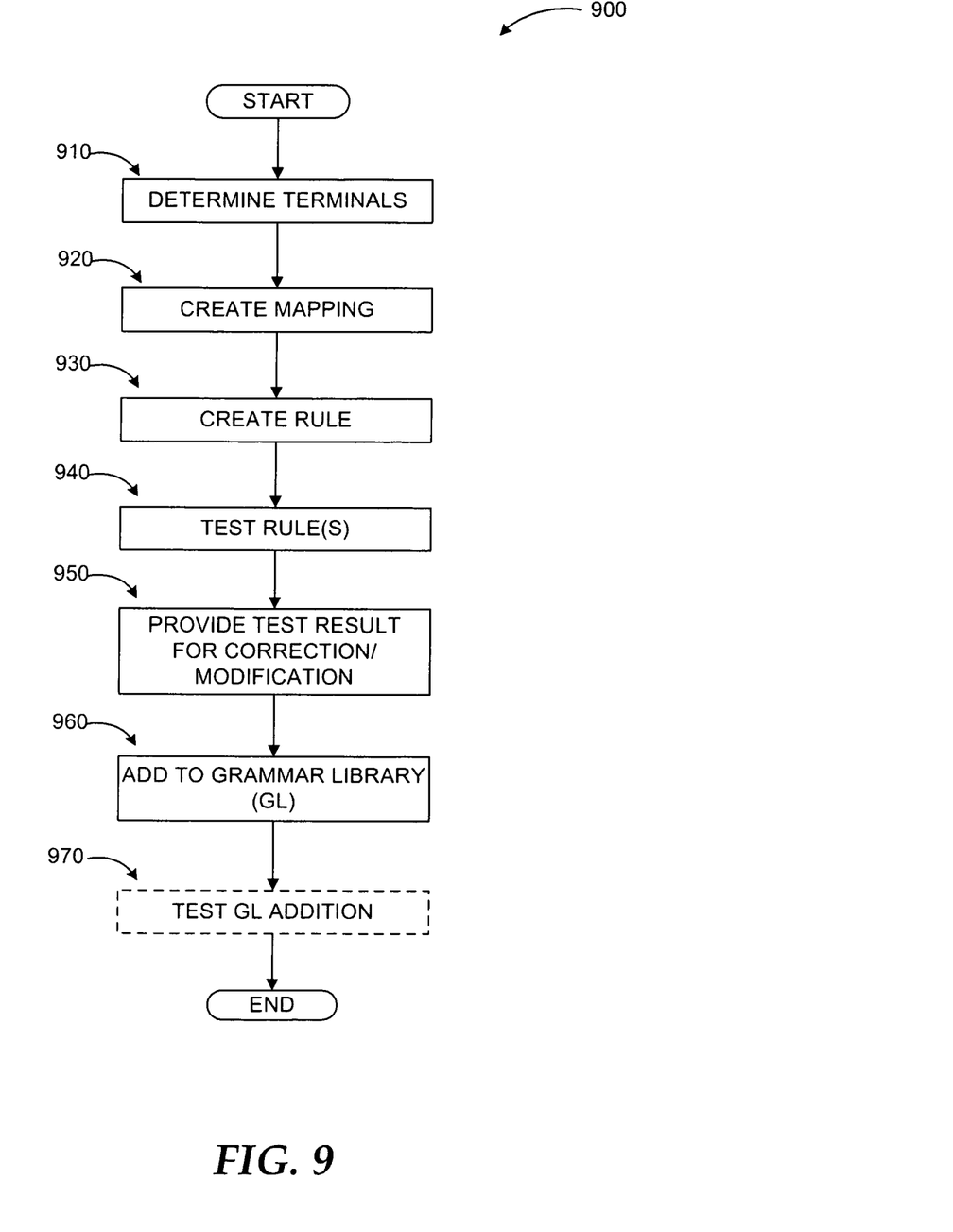
FIG. 9 illustrates a logic flow diagram for a process of creating consistent normalization maps and grammars according to embodiments.

FIG. 9 illustrates a logic flow diagram for process 900 of creating consistent normalization maps and grammars according to embodiments. Process 900 may be implemented, for example, as part of the authoring application 824 of FIG. 8.

Process 900 begins with operation 910, where terminals are determined. The terminals may be determined based on user selection among presented options or user definition. Next, the user is enabled to map the terminals at operation 920. This may be done through graphical interaction, textual input, or a combination of the two. At operation 930, the user is enabled to create a rule for the mapping. The rule may also be created through user selection among default rules, user definition, or a combination of the two.

At operation 940, the created rule(s) may be tested. The authoring tool may provide test scenarios automatically or enable the user to define test scenarios based on selection among available scenarios or defining new ones. At subsequent operation 950, the test results are provided to the user to enable the user to correct or modify the rule(s) if some of the results are not satisfactory. The testing and modification operations may be an iterative process repeated as necessary. Upon conclusion of the rule testing to the user's satisfaction, the new rules may be added to a grammar library for the speech recognition application at operation 960.

The additions to the grammar library may be tested at optional operation 970. Similar to the rule testing operation, an iterative process of testing and enabling the user to modify the additions may be provided at this optional step.

The operations included in process 900 are for illustration purposes. Providing a tool and framework for creating consistent normalization maps and grammars may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing a speech processing technology authoring tool and framework, the method comprising:
   enabling a user to specify at least two terminals through a user interface of the authoring tool executed by the computing device;
   enabling the user to create a mapping between the at least two terminals through the user interface of the authoring tool;
   enabling the user to specify a rule based on the mapping by combining the at least two terminals into list rules;
   displaying the user specified at least two terminals and the rule on the user interface to provide visual feedback to the user including listing element names, element types, and referencing relationships, displayed items comprising a display form and a spoken form of the user specified at least two terminals and the rule, wherein the specified terminals are reordered independently on the display form and the spoken form side of the displayed items using subscript indicators to allow the user to see a relationship between parts of the rule on either side of the displayed items;
   enabling the user to specify at least one test scenario for validating the rule;
   performing the specified test scenario to determine a performance of the rule in a speech processing environment, wherein the specified test scenario is executed within the user interface of the authoring tool to provide immediate feedback to the user;

presenting test results including a summary and detailed test results, such that the user is enabled to modify the rule through the user interface; and specifying an ordering of expected test results for validating a weighting of the rule.

2. The method of claim 1, further comprising:
enabling the user to select the rule to be exposed semantically;
enabling the user to select at least one function to generate semantics based on the rule;
adding the semantically exposed rule to a grammar; and
enabling testing of grammar rules and semantic processing.

3. The method of claim 2, wherein the at least one function is according to a common functions definition such that sharing of functions and rules across distinct languages and dialects is enabled.

4. The method of claim 1, further comprising:
sharing a runtime for applying the rule between speech processing engines to use a grammar that includes the rule such that speech processing consistency between applications employing the speech processing engines is achieved, wherein speech processing includes one of speech recognition and speech synthesis.

5. The method of claim 1, further comprising:
sharing a runtime with a development tool such that consistent speech recognition user experience is achieved by employing language models derived from creating maps with the development tool and applying the maps to language model input training text.

6. The method of claim 1, the authoring tool abstracts underlying logic to a graphical user interface (GUI) for enabling specification of terminals, list rules, sequence rules, and grammar rules.

7. The method of claim 6, wherein the GUI employs at least one of textual input and graphics based interaction to enable the user to specify the terminals, the list rules, the sequence rules, and the grammar rules.

8. The method of claim 1, wherein the mapping is transducer based mapping.

9. The method of claim 1, wherein the rule is for at least one of: text normalization, inverse text normalization, and grammars.

10. The method of claim 1, wherein the specified test scenario is executable anytime against the mapping such that the user is enabled to validate the rule multiple times prior to addition to a grammar.

11. The method of claim 1, wherein the test scenario is specified based on at least one of: a user selection from a default group of test scenarios and user definition of the test scenario, and wherein a predefined schema is employed for defining the test scenarios.

12. The method of claim 1, wherein the rule is presented by the user interface in one of: a searchable and collapsible tree format and in a searchable ordered format.

13. A computing device for providing a speech processing technology authoring tool and framework, comprising:
a memory;
a processor coupled to the memory, the processor executing a speech recognition application configured to provide speech recognition based on received voice input and training libraries and an authoring application associated with the speech processing technology authoring tool, the speech processing technology authoring tool configured to:
abstract an underlying logic to a (Graphical User Interface) GUI for enabling a user to specify terminals, list rules, sequence rules, and grammar rules, wherein the list rules and sequence rules are based on a user specified mapping between the terminals;
display a list of the user specified terminals, the list rules, the sequence rules, and the grammar rules as a table on the GUI to provide visual feedback to the user including listing element names, element types, and referencing relationships, the table comprising a display form and a spoken form of the listed user specified terminals and the list rules, the sequence rules, and the grammar rules, wherein the specified terminals are reordered independently on the display form and the spoken form side of the table using subscript indicators to allow the user to see a relationship between parts of the list rules, the sequence rules, and the grammar rules on either side of the table;
perform a plurality of test scenarios specified by one of a default list of test scenarios and the user;
present the user with a result of the test scenarios for enabling the user to modify the list rules and the sequence rules;
upon completion of the list rules and the sequence rules, expose a user selected portion of the list rules and sequence rules semantically employing common functions such that the completed rules are added to a grammar library; and
perform a plurality of test scenarios specified by one of a default list of test scenarios and the user to validate the additional rules to the grammar library.

14. The computing device of claim 13, wherein the authoring tool is further configured to share a runtime for applying the list rules and the sequence rules with speech processing engines through the framework such that speech processing consistency between applications employing the speech processing engines performing one of speech recognition and speech synthesis is achieved.

15. The computing device of claim 13, wherein the authoring tool is further configured to perform normalization of a word based on an attribute of at least one other adjacent word to ensure an agreement of corresponding attributes of the words.

16. The computing device of claim 15, wherein the attributes are based on a predefined schema associated with the normalization.

17. The computing device of claim 13, wherein the authoring tool is further configured to provide a weighting of elements of a list rule.

18. A computer-readable memory device with instructions stored thereon for specification of consistent normalization mapping and grammars, the instructions comprising:
enabling a user to specify terminals and rules through a user interface of an authoring tool based on a user specified normalization mapping between the terminals, the rules comprising list rules, sequence rules, and grammar rules;
displaying a list of the user specified terminals and the rules on the user interface to provide visual feedback to the user including listing element names, element types, and referencing relationships, the displayed list comprising a display form and a spoken form of the listed user specified terminals and the rules, wherein the specified terminals are reordered independently on the display form and the spoken form side of the displayed list using subscript indicators to allow the user to see a relationship between parts of the rules on either side of the displayed list;

performing a plurality of test scenarios specified by at least one of: a user selection and modification from a default list of test scenarios, wherein the plurality of specified test scenarios are executed within the user interface of the authoring tool to provide immediate feedback to the user;

providing results of the test scenarios and enabling the user to modify parameters of the terminals and the rules;

exposing completed rules semantically to a grammar using common functions such that the functions are to be shared among different languages and dialects; and abstracting a structure of the rules into a map to enable reuse of the rules for similar languages by importing the rules structure for a new language model and localizing the terminals.

19. The computer-readable memory device of claim 18, wherein the instructions further comprise:

providing the terminals, the rules, and the test scenarios employing at least one of: a graphical scheme and a color scheme; and enabling the user to select and modify the terminals, the rules, and the test scenarios through at least one of: textual input and graphical interaction.

20. The computer-readable memory device of claim 18, wherein the rules are exposed to a grammar for use in one of a build verification test process and a speech processing engine that shares a runtime with an authoring tool creating the rules for end-user experience consistency, wherein the speech processing engine is employed by applications including at least one from a set of word processing applications, presentation applications, browsing applications, navigational assistance applications, and communication applications, and wherein at least one of the applications are executed in a distributed manner over a plurality of computing devices communicating through a network.

* * * * *